March 12, 1929.    R. H. EMERY    1,704,886
HAT RACK FOR AUTOMOBILES
Filed Aug. 24, 1927    2 Sheets-Sheet 1
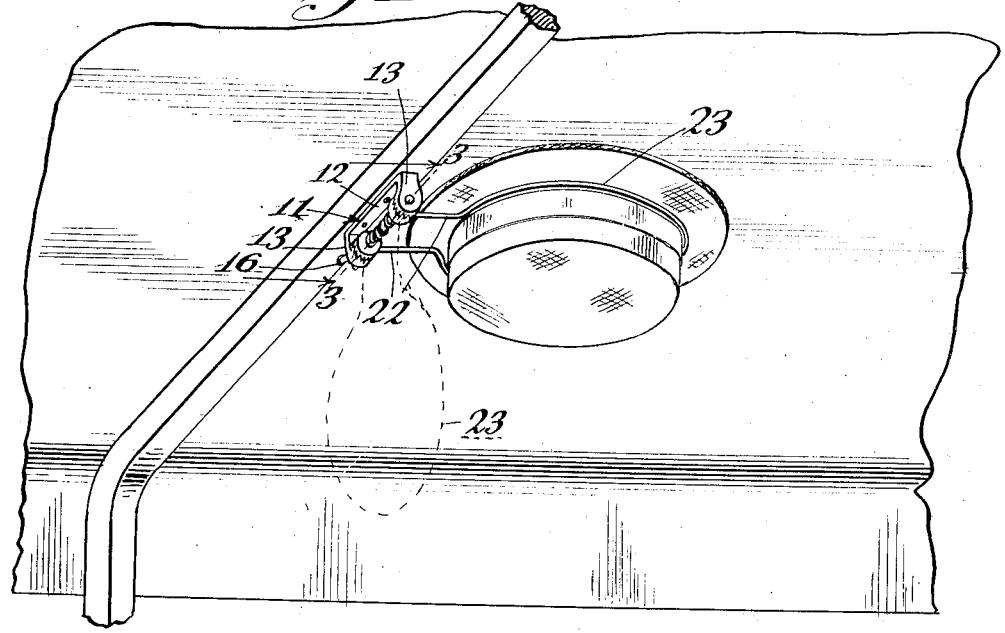
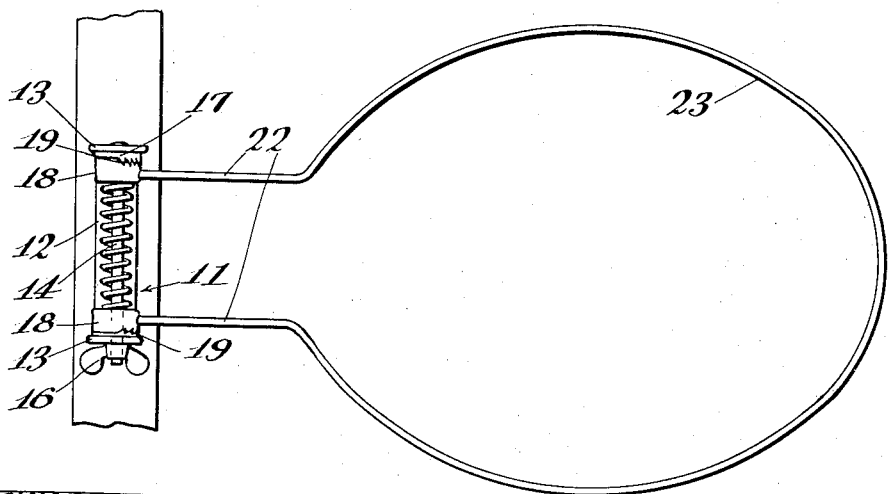
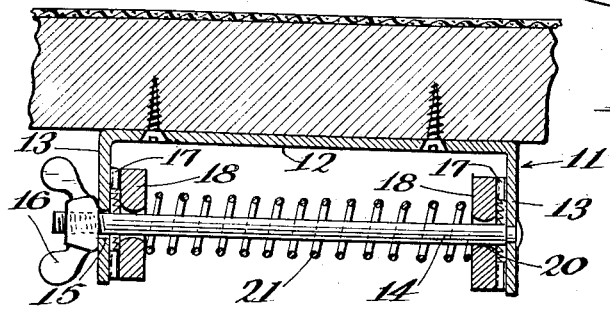
Inventor:
Robert H. Emery.
by Hazard and Miller
Attorneys March 12, 1929.  R. H. EMERY  1,704,886
HAT RACK FOR AUTOMOBILES
Filed Aug. 24, 1927  2 Sheets-Sheet 2

Inventor.
Robert H. Emery.
by Hazard and Miller
Attorneys.

Patented Mar. 12, 1929.

1,704,886

UNITED STATES PATENT OFFICE.

ROBERT H. EMERY, OF SAN BERNARDINO, CALIFORNIA.

HATRACK FOR AUTOMOBILES.

Application filed August 24, 1927. Serial No. 215,111.

My invention is a hat rack particularly adapted for automobiles, to secure a person's hat in an out-of-the-way position.

An object of my invention is the construction of a hat rack which may be hingedly attached preferably to the roof of an automobile to permit the device to be pivoted downwardly for the insertion of a hat, and then swung upwardly, holding the hat in a secured position against the top of the automobile.

A more specific object of my invention is the construction of a rack having a loop which encircles the crown of the hat and engages the rim. This loop is attached to a pair of arms, these arms having a securing device on their ends which effectively retains the loop either in a vertical position for inserting the hat, or in a horizontal position with the rim adjacent the top of the vehicle.

Another object of my invention is the use of a coat hanger which may be hooked to the hat rack to be detachable therefrom when desired.

In constructing my invention, I preferably use a bracket with ears which may be attached to a structure of the roof of the automobile. This bracket has a pivot pin secured thereto, with a clamping screw. On each of the ears there is a fixed ratchet, and on each of the arms there is a movable ring having ratchet teeth thereon, each of the rings being pivotally mounted on the pivot bolt, and a coil spring is wound on the bolt and normally presses the rings apart. The arms and the loop are attached to these rings, and by means of the position of the ratchet, the hat may be held in any desired position, and by merely squeezing the arms together, the rings are disengaged from the fixed ratchet and allow shifting of the loop.

My invention is illustrated in the accompanying drawings, in which:

Figure 1 is a perspective view of my hat rack with the hat therein as fitted in an automobile.

Figure 2 is an underneath view.

Figure 3 is a detailed section on the line 3—3 of Figure 1 in the direction of the arrows.

Figure 4:
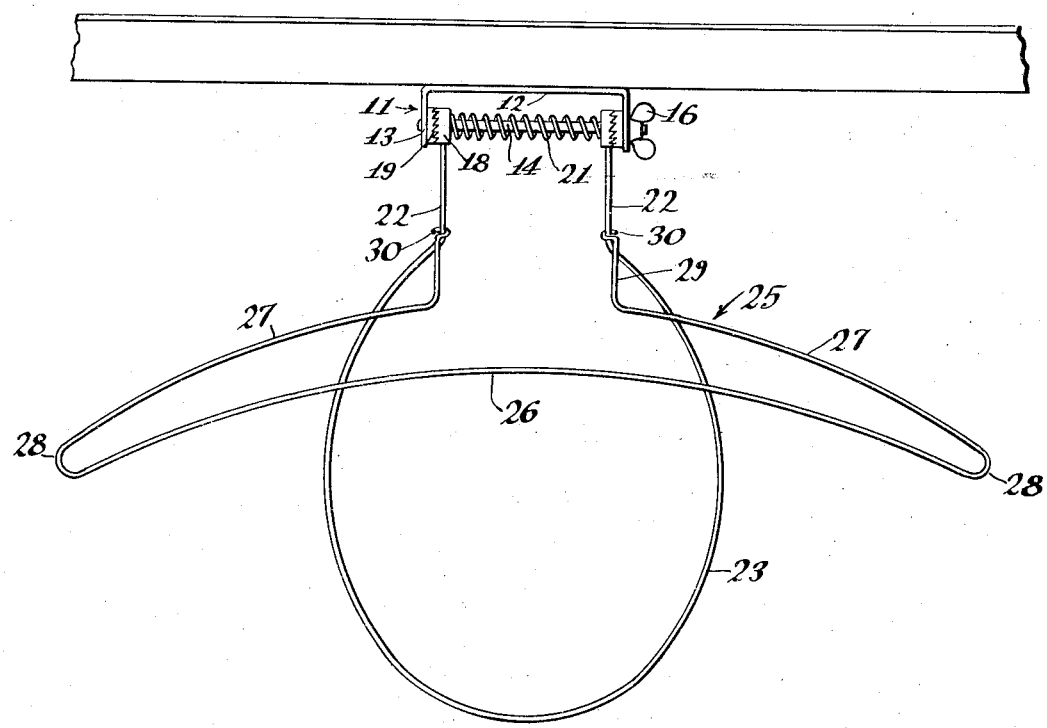
Figure 4 is an elevation showing a coat hanger secured to my hat rack.
Figure 5:
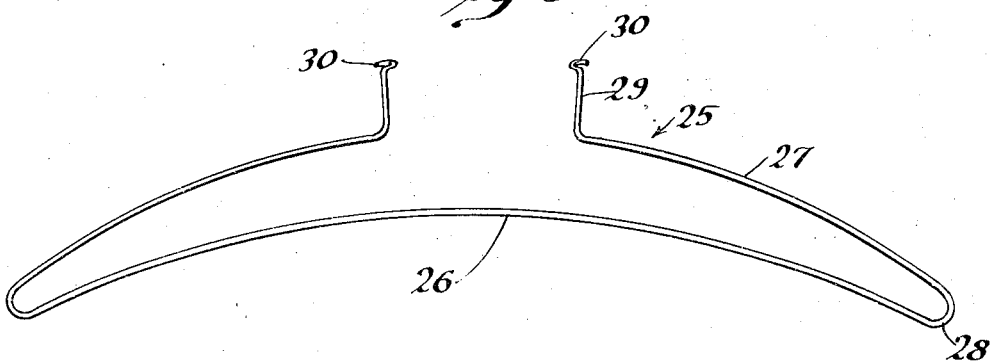
Figure 5 is a view of the coat hanger detached from the hat rack.

My invention comprises a bracket 11 which has a flat strap section 12 and a pair of ears 13. A pivot bolt 14 is connected between the said ears, the bolt passing through an aperture 15 in one of the ears, and having a thumb nut 16 thereon. Attached immovably to the ears there are ratchet rings 17. Movable ratchet rings 18 fit on the pivot bolt and have preferably radially disposed teeth which intermesh with the teeth of the stationary ratchet rings 17 as indicated by the numeral 19. These rings have a bore 20 in the center which is chamfered as indicated in Figure 3, which construction allows the rings to be freely moved when desired. A compression spring 21 is coiled on the pivot bolt and presses the rings 18 apart.

Secured to each of the ratchet rings 18 there is a wire arm 22, and these wires are formed into a loop 23, the loop being adapted to extend around a hat adjacent the rim as indicated in Figure 1. By pressing the arms 22 together, the ratchet rings 17 and 18 may be disengaged one from the other and allow the shifting of the loop from the dotted line position of Figure 1, to the upper solid line position.

I have found the use of my device to be considerably facilitated when the ratchet rings 17 and 18 are constructed as shown in Figure 2. Instead of providing the ratchet rings with the radially disposed teeth throughout the entire surfaces thereof which are in engagement; or, in other words, throughout 360° upon each ring those portions 17' and 18' of the rings 17 and 18 respectively, which are upon the opposite side of the bolt 14 from the wire arms 22, are smooth. Since the points at which pressure is applied to the device in releasing the movable ratchet rings 18 from the fixed ratchet rings 17, are spaced from the points at which the spring 21 applies its counter-pressure, a bending moment results, causing the movable rings 18 to alter their degree of angularity with the bolt 14. Hence, the portions of the rings 17 and 18 remote from the wire arms 22, will not disengage until more pressure has been applied to the arms 22 than is necessary for the disengagement of the portions of the rings proximal to the arms 22. Therefore, by forming the rings smooth, at those portions which disengage last, a lesser degree of movement of the movable rings toward each other and against the action of the springs 21 is required to effect release of the loop 23 for pivotal movement about the bolt 14.

The manner of using and functioning of my hat rack is believed apparent. However, it may be stated that in order to insert the hat, the loop is preferably suspended as indicated by the dotted line position of Figure 1, and the hat inserted. Then the loop may be shoved upwardly against the loop on top of the vehicle, and the fixed ratchet teeth engaging with the ratchet teeth on the movable rings 18, holding these and the loop with the hat therein in a stationary position. In order to remove the hat, it is merely necessary to press the arms 22 together and pull the device into the vertical position, again lifting the hat out of the ring. It is manifest that the operation or tightening of the thumb nut 16 will spring the ears inwardly slightly, thereby to a certain extent compressing the spring 21.

It is obvious that the bracket may be secured in any suitable position on a vehicle by means of screws extending through the strap part 12 or in any other desirable manner.

In the construction of the coat hanger connection to my hat rack I form a coat hanger, designated by the numeral 25, of wire. This has a base section 26 with two inwardly bent parts 27 connected by a return bend 28. Two straight or vertical sections 29 connect onto the sections 27 and have a hook 30 formed at their ends.

The manner of connection and functioning of the coat hanger in connection with the hat rack is substantially as follows: When it is desired to attach the coat hanger to the hat rack the vertical straight wire ends 29 may be pressed inwardly so that the hooks 30 engage on the inside of the arms 22 of the hat rack. Then the resiliency of the coat hanger causes the arms to pull outwardly, firmly engaging the hooks to the wire of the hat rack. The hat rack and coat hanger normally depend in the position shown in Fig. 4 and in this position a coat may be hung on the hanger, the sections 27 of the wire fitting underneath the shoulders and the reverse bends 28 extending into the sleeves. If a coat is hung after inserting a hat in the hat rack, the back or front of the coat may engage the rim of the hat and hold it in position, both being suspended in the position shown in Fig. 4, or if desired the hat rack may be hinged up against the top of the vehicle as shown in Fig. 1 with a hat therein and the coat hanger wire will hang downwardly from the arms 22 and may support a coat with the collar of the coat adjacent the roof of the vehicle. It will be seen by the hook connection of the coat hanger to the arms of the hat rack that the coat hanger may be readily detached if desired.

Various changes may be made in the principles of my invention without departing from the spirit thereof, as set forth in the description, drawings and claims.

I claim:

1. A hat rack comprising in combination a bracket adapted for attachment to the roof of a vehicle, a pair of fixed ratchet rings connected to the bracket, a pair of movable ratchet rings inter-engaging with the fixed ratchet rings, teeth on portions of the engaging surfaces of said rings, the remainder of said surfaces being smooth, a loop connected to each of the movable ratchets, the loop being adapted to support a hat, the inter-engagement of the ratchets supporting the loop with a hat adjacent the roof of a vehicle, or allowing suspending of the loop for insertion of the hat.

2. A hat rack comprising in combination a bracket adapted for attachment to the roof of a vehicle and having a pivot bolt connected thereto, a pair of fixed ratchet rings secured to the brackets, a pair of ratchet rings rotatably mounted on the pivot bolt between said fixed ratchet rings, teeth on portions of the adjacent surfaces of said rings, the remainder of said surfaces being smooth, a spring forcing said movable ratchet rings apart, and a loop of wire having its opposite ends connected to the two ring ratchets, the spring being compressible to allow disengaging of the movable ratchets and the fixed ratchets, thereby permitting the swinging of the loop to various positions, the inter-engagement of the ratchets retaining the loop in an adjusted position.

3. A hat rack comprising in combination a bracket having a flat strap section with means to attach same to the roof of a vehicle, there being a pair of ears extending outwardly from the strap section, a bolt extending between the said ears, means to tighten said bolt and spring the ears inwardly, a fixed ratchet ring secured to each of the ears on the inside, a pair of movable ratchet rings mounted on the bolt and interengaging with the fixed ratchets, teeth on portions of the engaging surfaces of the rings, the remainder of said surfaces being smooth, a coil spring on the bolt pressing the ring ratchets apart, a wire having a pair of arms at its ends, the arms being secured to the movable ratchets adjacent the toothed portion thereof, and a loop formed in the wire connected to the arms, the loop being adapted to engage and retain a hat, the movement inwardly of the arms disengaging the ring ratchets and the fixed ratchets, allowing swinging of the loop into adjusted positions.

In testimony whereof I have signed my name to this specification.

ROBERT H. EMERY.